US012266951B2

(12) United States Patent
Lee et al.

(10) Patent No.: US 12,266,951 B2
(45) Date of Patent: Apr. 1, 2025

(54) ELECTRONIC DEVICE INCLUDING A PLURALITY OF MAGNET MODULES

(71) Applicant: SAMSUNG ELECTRONICS CO., LTD., Suwon-si (KR)

(72) Inventors: Woosup Lee, Suwon-si (KR); Jaehyoung Yoo, Suwon-si (KR); Jaedeok Lim, Suwon-si (KR); Taejun Lim, Suwon-si (KR); Hana Choe, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 205 days.

(21) Appl. No.: 17/973,907

(22) Filed: Oct. 26, 2022

(65) Prior Publication Data

US 2023/0179024 A1 Jun. 8, 2023

Related U.S. Application Data

(63) Continuation of application No. PCT/KR2022/015556, filed on Oct. 14, 2022.

(30) Foreign Application Priority Data

Dec. 7, 2021 (KR) .................. 10-2021-0173843
Mar. 4, 2022 (KR) .................. 10-2022-0028263

(51) Int. Cl.
*H02J 50/90* (2016.01)
*H02J 50/00* (2016.01)
(Continued)

(52) U.S. Cl.
CPC ............ *H02J 50/90* (2016.02); *H02J 50/005* (2020.01); *H02J 50/10* (2016.02); *H01F 27/2885* (2013.01)

(58) Field of Classification Search
CPC ..... H02J 50/005; H02J 50/10–12; H02J 50/90
See application file for complete search history.

(56) References Cited

U.S. PATENT DOCUMENTS 10,312,718 B2 6/2019 Hahn et al.
10,381,881 B2 8/2019 Wittenberg et al.
(Continued)

FOREIGN PATENT DOCUMENTS

CN 104868564 8/2015
KR 10-2013-0075077 7/2013
(Continued)

OTHER PUBLICATIONS

Search Report dated Jan. 31, 2023 in International Application No. PCT/KR2022/015556 and English-language translation.

*Primary Examiner* — Rexford N Barnie
*Assistant Examiner* — David A Shiao
(74) *Attorney, Agent, or Firm* — Nixon & Vanderhye, P.C.

(57) ABSTRACT

An example electronic device includes a battery, a coil antenna that transmits power of the battery, a shield disposed on a lower surface of the coil antenna, and a plurality of magnet modules formed to surround at least a portion of a side surface of the coil antenna. Each of the plurality of magnet modules includes an inner part that faces toward the side surface of the coil antenna, an outer part that faces toward an opposite side to the coil antenna, and a non-magnetized area disposed between the inner part and the outer part. The inner part includes a first inner area and a second inner area over the first inner area, and the outer part includes a first outer area and a second outer area over the first outer area. The first inner area and the second outer area are magnetized with a first polarity, and the second inner (Continued)

area and the first outer area are magnetized with a second polarity opposite to the first polarity.

15 Claims, 21 Drawing Sheets

(51) Int. Cl.
*H02J 50/10* (2016.01)
*H01F 27/28* (2006.01)

(56) References Cited

U.S. PATENT DOCUMENTS

| | | | |
|---|---|---|---|
| 10,404,089 B2 | 9/2019 | Kasar et al. | |
| 10,491,041 B2 | 11/2019 | Wittenberg et al. | |
| 10,505,386 B2 | 12/2019 | Kasar et al. | |
| 10,886,771 B2 | 1/2021 | Kasar et al. | |
| 10,965,162 B2 | 3/2021 | Pinciuc et al. | |
| 11,426,091 B2 | 8/2022 | Clavelle et al. | |
| 11,463,131 B2 | 10/2022 | Lee et al. | |
| 2017/0201194 A1 | 7/2017 | Hahn et al. | |
| 2019/0074719 A1 | 3/2019 | Wittenberg et al. | |
| 2019/0222063 A1* | 7/2019 | Park | H04B 5/00 |
| 2019/0348864 A1 | 11/2019 | Pinciuc et al. | |
| 2020/0112195 A1 | 4/2020 | Kasar et al. | |
| 2021/0099026 A1 | 4/2021 | Larsson et al. | |
| 2021/0099027 A1* | 4/2021 | Larsson | H02J 50/90 |
| 2021/0099028 A1 | 4/2021 | Thompson et al. | |
| 2021/0099029 A1 | 4/2021 | Oro et al. | |
| 2021/0099030 A1 | 4/2021 | Walton et al. | |
| 2021/0175749 A1 | 6/2021 | Pinciuc et al. | |
| 2022/0094382 A1* | 3/2022 | Cole | H04B 1/3888 |
| 2022/0311286 A1* | 9/2022 | Schwartz | H02J 50/10 |
| 2022/0320903 A1* | 10/2022 | Lee | H02J 7/0044 |
| 2022/0385106 A1* | 12/2022 | Haug | H02J 50/90 |
| 2022/0407354 A1* | 12/2022 | Louis | H01F 1/34 |
| 2022/0416590 A1* | 12/2022 | Rasmussen | H01F 7/0247 |
| 2022/0416591 A1* | 12/2022 | Chabalko | H02J 50/10 |
| 2024/0120772 A1* | 4/2024 | Jang | H02J 50/005 |

FOREIGN PATENT DOCUMENTS

| | | |
|---|---|---|
| KR | 10-2015-0137533 | 12/2015 |
| KR | 10-2018-0063023 | 6/2018 |
| KR | 10-2019-0027341 | 3/2019 |
| KR | 10-2020-0066118 | 6/2020 |
| KR | 10-2020-0115429 | 10/2020 |
| KR | 10-2021-0037577 | 4/2021 |
| KR | 10-2021-0075550 | 6/2021 |

* cited by examiner

ELECTRONIC DEVICE INCLUDING A PLURALITY OF MAGNET MODULES

CROSS-REFERENCE TO RELATED APPLICATIONS

This application is a continuation of International Application No. PCT/KR2022/015556 designating the United States, filed on Oct. 14, 2022, in the Korean Intellectual Property Receiving Office and claiming priority to Korean Patent Application No. 10-2021-0173843, filed on Dec. 7, 2021, in the Korean Intellectual Property Office, and to Korean Patent Application No. 10-2022-0028263, filed on Mar. 4, 2022, in the Korean Intellectual Property Office, the disclosures of each of which are incorporated by reference herein in their entireties.

BACKGROUND

Field

Various embodiments of the disclosure described herein relate to an electronic device including a plurality of magnet modules.

Description of Related Art

An electronic device may transmit power or data using a coil antenna. The coil antenna may transmit power according to an international standard set by the Wireless Power Consortium (WPC). The coil antenna may transmit data by a magnetic secure transfer (MST) method or a near field communication (NFC) method. Accordingly, at least one coil antenna for implementing each method may be disposed in the electronic device. A shielding member may be disposed on one surface of the coil antenna to reduce a phenomenon in which the coil antenna interferes with another coil antenna or a magnetic field radiated from the coil antenna is lost by a metal part in the electronic device.

SUMMARY

A plurality of magnet modules may be disposed around the coil antenna to attach an external electronic device to the electronic device. The external electronic device may be a wireless charging device that wirelessly transmits power. The plurality of magnet modules may attach the external electronic device to the portion in which the coil antenna is disposed, or may allow the external electronic device to rotate in the state in which the external electronic device is attached. To attach the external electronic device and rotate the attached external electronic device in the area in which the coil antenna is disposed, the plurality of magnetized magnet modules may be disposed on the side surface of the coil antenna.

When the plurality of magnet modules magnetized in a horizontal direction parallel to a front plate and a back plate of the electronic device are disposed on the side surface of the coil antenna, magnetic flux generated from the plurality of magnet modules may be induced to the shielding member. When the magnetic flux is induced to the shielding member, the shielding member may be saturated, and therefore the magnetic-field shielding function of the shielding member may be reduced. When the magnetic-field shielding function of the shielding member is reduced, the magnetic field generated from the coil antenna may cause eddy currents in an electrical component or a metal part of the electronic device disposed on the rear surface of the coil antenna, and therefore the efficiency of the coil antenna may be decreased.

Furthermore, when the plurality of magnet modules magnetized in the horizontal direction are disposed on the side surface of the coil antenna, the plurality of magnet modules may be disposed such that the area of a region magnetized with an N pole and the area of a region magnetized with an S pole are equal to each other and symmetrical to each other. When electrical components, such as an antenna and a camera module, are disposed in a compact electronic device, a space in which the plurality of magnet modules are able to be disposed in the electronic device is limited. Accordingly, it may not be easy to mount the plurality of magnet modules in the electronic device.

Various embodiments of the disclosure provide an electronic device for increasing the efficiency of a coil antenna by reducing magnetic flux induced to a shield when a plurality of magnet modules are disposed on a side surface of the coil antenna.

In addition, various embodiments of the disclosure provide an electronic device for reducing a limitation in space for mounting a plurality of magnet modules.

An electronic device according to an embodiment of the disclosure includes a battery, a coil antenna that transmits power of the battery, a shield disposed on a lower surface of the coil antenna, and a plurality of magnet modules formed to surround at least a portion of a side surface of the coil antenna. Each of the plurality of magnet modules includes an inner part that faces toward the side surface of the coil antenna, an outer part that faces toward an opposite side to the coil antenna, and a non-magnetized area disposed between the inner part and the outer part. The inner part includes a first inner area and a second inner area over the first inner area, and the outer part includes a first outer area and a second outer area over the first outer area. The first inner area and the second outer area are magnetized with a first polarity, and the second inner area and the first outer area are magnetized with a second polarity opposite to the first polarity.

An electronic device according to an embodiment of the disclosure includes a battery, a coil antenna that transmits power of the battery, a shield disposed on a lower surface of the coil antenna, and a plurality of magnet modules formed to surround at least a portion of a side surface of the coil antenna. Each of the plurality of magnet modules includes an inner part that faces toward the side surface of the coil antenna, an outer part that faces toward an opposite side to the coil antenna, and a non-magnetized area disposed between the inner part and the outer part. A width of the inner part is constant when viewed in a first direction that a rear surface of the electronic device faces, and, when viewed in the first direction, a width of the outer part in an area in which an electrical component of the electronic device is disposed differs from a width of the outer part in a remaining area other than the area in which the electrical component is disposed.

According to the embodiments of the disclosure, by vertically disposing the plurality of magnet modules on the side surface of the coil antenna, the magnetic flux may be formed in the vertical direction, and magnetic flux induced to the shielding member may be decreased. Accordingly, a phenomenon in which the shielding member is saturated may be reduced, and thus the efficiency of the coil antenna may be increased.

Furthermore, according to the embodiments of the disclosure, the plurality of magnet modules may be disposed in consideration of the space in the electronic device and electrical components in the electronic device. Accordingly, a limitation in space for mounting the plurality of magnet modules may be reduced.

In addition, the disclosure may provide various effects that are directly or indirectly recognized.

BRIEF DESCRIPTION OF THE DRAWINGS

With regard to description of the drawings, identical or similar reference numerals may be used to refer to identical or similar components.

DETAILED DESCRIPTION

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
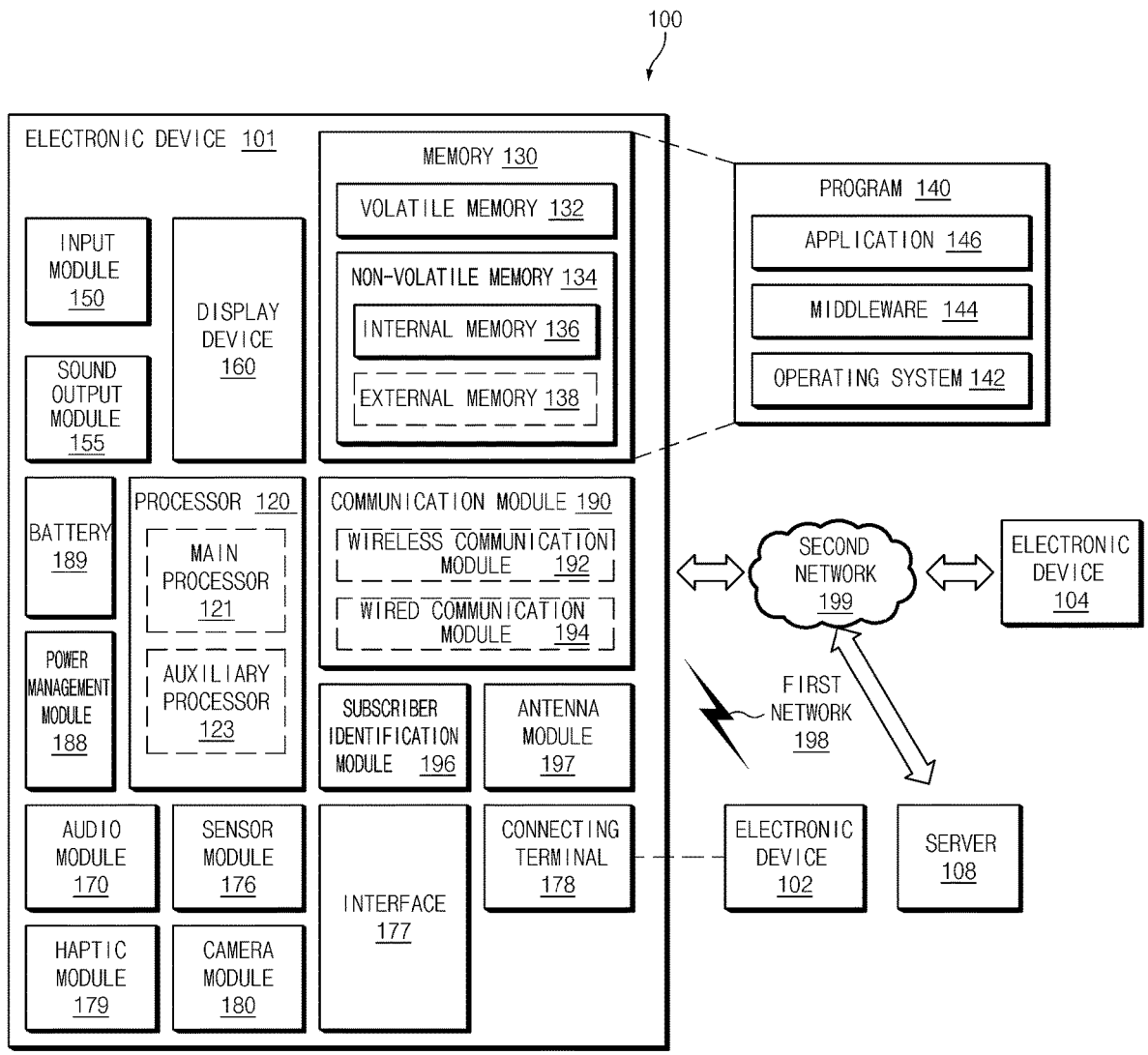
FIG. 1 is a block diagram illustrating an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module (SIM) 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type from, the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
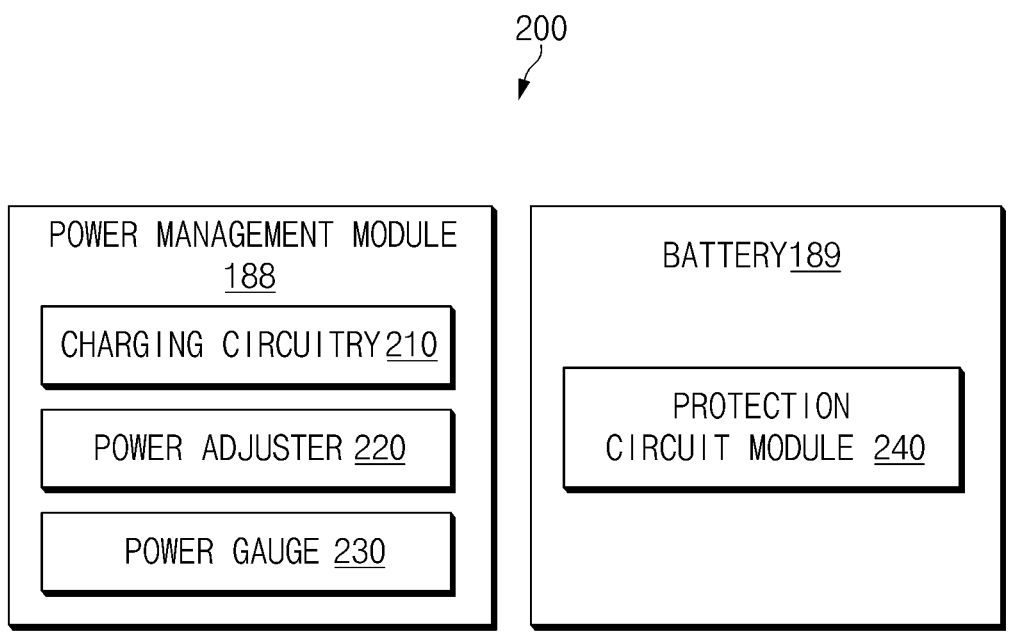
FIG. 2 is a block diagram illustrating an example power management module and a battery according to various embodiments.

FIG. 2 is a block diagram 200 illustrating the power management module 188 and the battery 189 according to various embodiments. Referring to FIG. 2, the power management module 188 may include charging circuitry 210, a power adjuster 220, or a power gauge 230. The charging circuitry 210 may charge the battery 189 using power supplied from an external power source outside the electronic device 101. According to an embodiment, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to be abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured or obtained using a corresponding sensor (e.g., a temperature sensor) of the sensor module 176, the power gauge 230, or the power management module 188. According to an embodiment, the corresponding sensor (e.g., a temperature sensor) of the sensor module 176 may be included as part of the PCM 240, or may be disposed near the battery 189 as a separate device.

Figure 3:
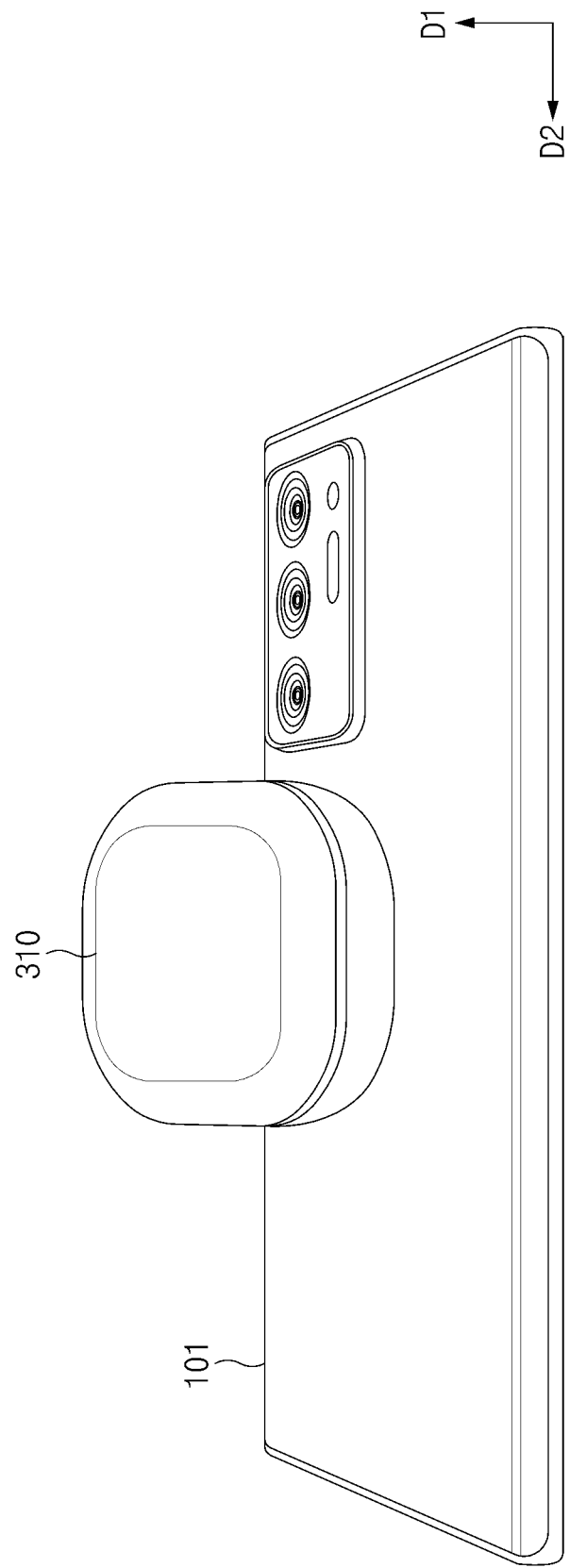
FIG. 3 illustrates an example of wireless power transmission to an external electronic device by the electronic device according to various embodiments.

FIG. 3 illustrates wireless power transmission to an external electronic device 310 (e.g., the electronic device 102 of FIG. 1) by the electronic device 101 according to various embodiments.

The electronic device 101 may transmit power and/or data to the external electronic device 310. The electronic device 101 may wirelessly transmit power to the external electronic device 310 located adjacent to the electronic device 101. The electronic device 101 may transmit power in a first direction D1 that the rear surface of the electronic device 101 faces. The electronic device 101 may wirelessly transmit power to the external electronic device 310 placed on the rear surface of electronic device 101. An area that wirelessly transmits power may be formed in the central portion of the electronic device 101 based on a second direction D2 that is the lengthwise direction of the electronic device 101.

Figure 4:
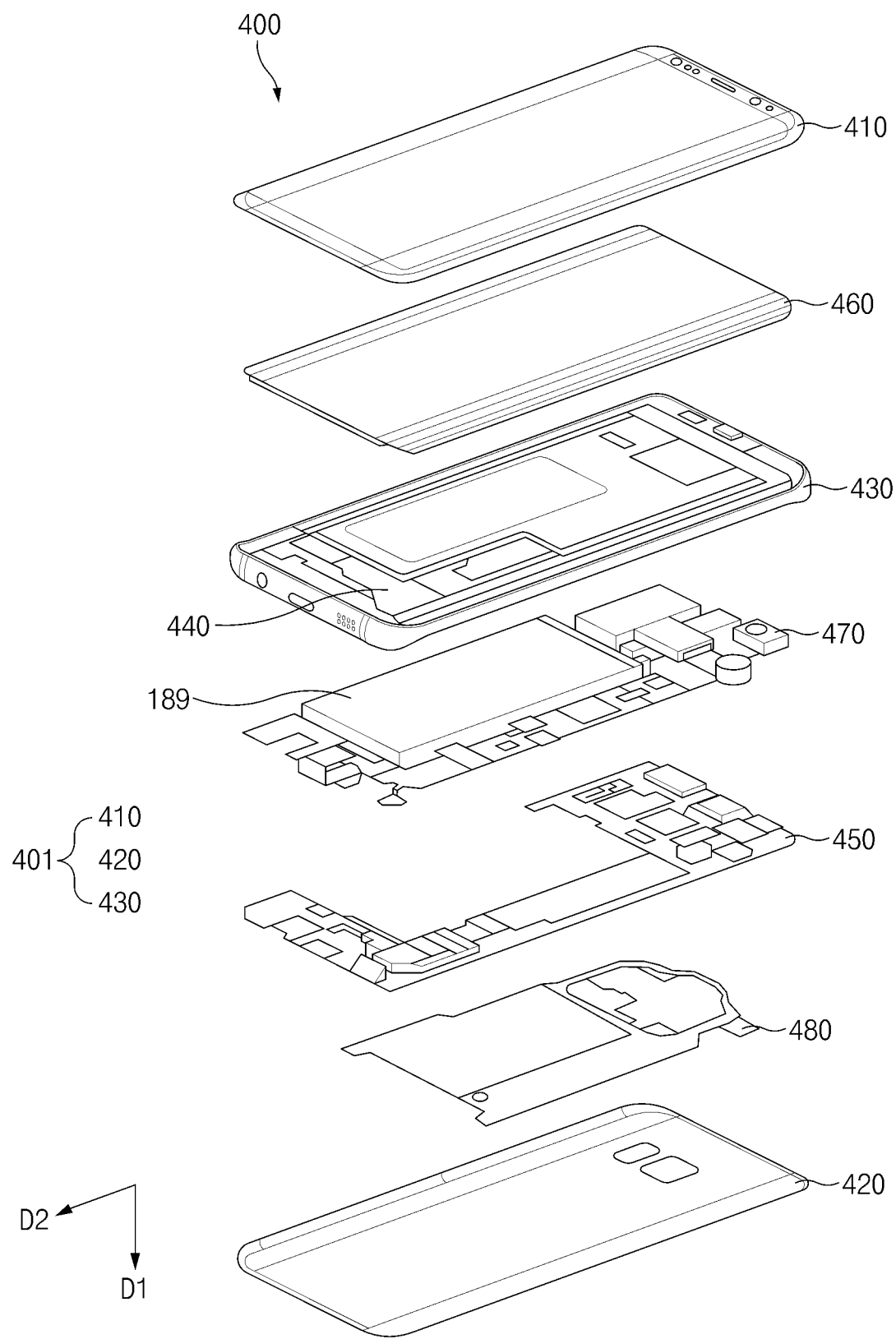
FIG. 4 is an exploded perspective view of an example electronic device according to various embodiments.

FIG. 4 is an exploded perspective view 400 of an example electronic device (e.g., the electronic device 101 of FIG. 3) according to various embodiments.

The electronic device 101 may include a housing 401, a first support member 440 (e.g., a bracket), a second support member 450 (e.g., a rear case), a display 460 (e.g., the display module 160 of FIG. 1), a printed circuit board 470, the battery 189, and an antenna 480. At least one component (e.g., the first support member 440 or the second support member 450) among the components of the electronic device 101 may be omitted, or other component(s) may be additionally included in the electronic device 101.

The housing 401 may include a front plate 410, a back plate 420 facing the first direction D1, and a side member 430 surrounding a space between the front plate 410 and the back plate 420. The front plate 410 may be formed by a glass plate or a polymer plate, at least a portion of which is substantially transparent. The back plate 420 may be formed by a substantially opaque plate, for example, coated or colored glass, ceramic, a polymer, metal (e.g., aluminum, stainless steel (STS), or magnesium), or a combination of at least two of these or other materials. The side member 430 may be formed to be a side bezel structure that is coupled with the front plate 410 and the back plate 420 and that contains metal and/or a polymer. The back plate and the side bezel structure may be integrally formed with each other and may contain the same material (e.g., a metallic material, such as aluminum).

The first support member 440 may be disposed inside the electronic device 101 and may be connected with the side member 430. The first support member 440 may be integrally formed with the side member 430. The first support member 440 may be formed of a metallic material and/or a nonmetallic (e.g., polymer) material. The display 460 may be coupled to one surface of the first support member 440. The printed circuit board 470 may be coupled to an opposite surface of the first support member 440 that faces the first direction D1.

The display 460 may be exposed for viewing through most of the front plate 410. The periphery of the display 460 may be formed to be substantially the same as the shape of the adjacent outside edge of the front plate 410. To expand the area by which the display 460 is exposed, the gap between the outside edge of the display 460 and the outside edge of the front plate 410 may be formed to be substantially constant.

At least one electrical component, such as an audio module (e.g., the sound output module 155 of FIG. 1), a sensor module (e.g., the sensor module 176 of FIG. 1), and a camera module (e.g., the camera module 180 of FIG. 1), may be disposed in an area corresponding to a recess or opening formed in a portion of a screen display area of the display 460 or may be disposed on the rear surface of the screen display area of the display 460. The display 460 may be combined with, or disposed adjacent to, touch detection circuitry, a pressure sensor capable of measuring the intensity (pressure) of a touch, and/or a digitizer for detecting a stylus pen of a magnetic field type.

A processor (e.g., the processor 120 of FIG. 1), memory (e.g., the memory 130 of FIG. 1), and/or an interface (e.g., the interface 178 of FIG. 1) may be mounted on the printed circuit board 470. The processor 120 may include, for example, one or more of a central processing unit, an application processor, a graphic processing unit, an image signal processor, a sensor hub processor, or a communication processor. The memory 130 may include, for example, volatile memory or nonvolatile memory. The interface may include, for example, a high definition multimedia interface (HDMI), a universal serial bus (USB) interface, an SD card interface, and/or an audio interface.

The battery 189 may supply power to at least one component of the electronic device 101. The battery 189 may include a primary cell that is not rechargeable, a secondary cell that is rechargeable, or a fuel cell. At least a portion of the battery 189 may be disposed on substantially the same plane as the printed circuit board 470. The battery 470 may be integrally disposed inside the electronic device 101. The battery 470 may be disposed to be detachable from the electronic device 101.

The antenna 480 may be disposed between the back plate 420 and the battery 189. The antenna 480 may include at least one of a wireless charging antenna, a near field communication (NFC) antenna, or a magnetic secure transfer (MST) antenna. The antenna 480 may include a coil antenna. The antenna 480 including the coil antenna may have a circular shape. However, without being limited thereto, the antenna 480 may be a flexible printed circuit board (FPCB) antenna having a shape other than a circular shape. The antenna 480 may wirelessly supply power to an external electronic device (e.g., the external electronic device 310 of FIG. 3).

Figure 5:
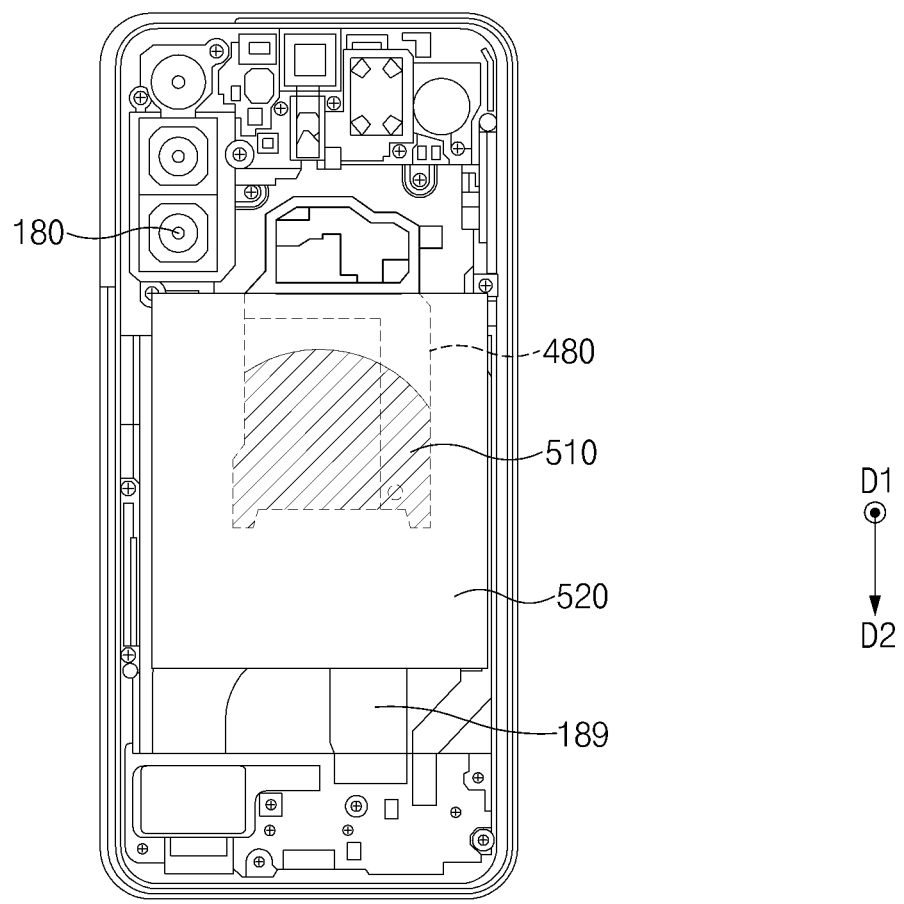
FIG. 5 is a view of an example electronic device as viewed in a first direction that a rear surface of the electronic device faces.

FIG. 5 is a view of an example electronic device (e.g., the electronic device 101 of FIG. 3) as viewed in the first direction D1 that the rear surface of the electronic device 101 faces.

The electronic device 101 may include the camera module 180, the battery 189, and at least one electrical component, such as a 4G long term evolution (LTE) module or a 5G new radio (NR) module, which is disposed separately from the antenna 480. The camera module 180 may be disposed in one corner of the electronic device 101 when viewed in the first direction D1 that the rear surface of the electronic device 101 faces. The battery 189, when viewed in the first direction D1, may be disposed in the central area of the electronic device 101 based on the second direction D2. The 4G long term evolution (LTE) module or the 5G new radio (NR) module, when viewed in the first direction D1, may be disposed in an area other than the areas in which the camera module 180 and the battery 189 are disposed. The 4G long term evolution (LTE) module or the 5G new radio (NR) module, when viewed in the first direction D1, may be disposed to be biased toward an upper area of the electronic device 101.

The electronic device 101 may include the antenna 480. The antenna 480 may be disposed between the battery 189 and the back plate (e.g., the back plate 420 of FIG. 4). The antenna 480 may include one or more coils. The antenna 480 may be formed of a metallic material such as copper. The antenna 480 may be an FPCB antenna. The antenna 480 may be disposed to at least partially overlap the battery 189 in the first direction D1. The antenna 480 may be disposed so as not to overlap the camera module 180 in the first direction D1.

The antenna 480 may be configured in a coil pattern according to an international standard set by the Wireless Power Consortium (WPC). The antenna 480 may transmit power according to the standard set by the WPC. The antenna 480 may wirelessly transmit power in the first direction D1. The antenna 480 may transmit data by a magnetic secure transfer (MST) method or a near field communication (NFC) method using a coil other than a coil for transmitting power among the one or more coils.

The antenna 480 may include a shielding member, at least one pattern, and a plurality magnet modules. The one or more coils, the shielding member, and the plurality of magnet modules may be formed to be one module. For example, the one or more coils, the shielding member, and the plurality of magnet modules may be formed to be one module on an FPCB and may be disposed between the battery 189 and the back plate 420.

The shielding member may be formed of a magnetic substance. The shielding member may reduce eddy currents formed in an electrical component and a metal part inside the electronic device 101 by a magnetic field. The shielding member may reduce a magnetic-field loss of the coil antenna caused by the electrical component and the metal part inside the electronic device 101.

The at least one pattern may be disposed in a pattern area 510. The at least one pattern may be formed of a metallic material such as copper. The at least one pattern may radiate power energy to perform wireless charging.

A magnet area 520 in which the plurality of magnet modules are disposed may be formed around the pattern area 510. The plurality of magnetized magnet modules may be disposed in the magnet area 520. The plurality of magnet modules may be formed of a magnetized rare-earth element or a magnetized metallic material. The plurality of magnet modules may align the antenna 480. The plurality of magnet modules may increase a coupling coefficient between a coil forming a transmission part TX of the antenna 480 and a coil forming a reception part RX of the antenna 480. The plurality of magnet modules may increase the power or data transmission efficiency of the antenna 480.

Figure 6:
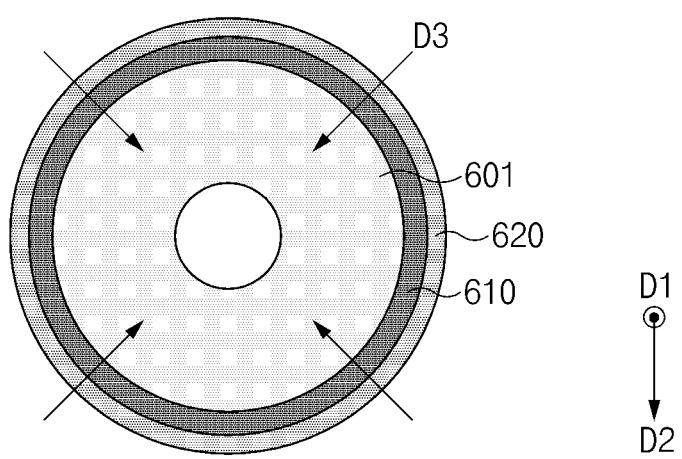
FIG. 6 is a view of an example coil antenna and magnet modules around the coil antenna as viewed in the first direction.

FIG. 6 shows an example coil antenna 601 and magnet modules 610 and 620 around the coil antenna 601 as viewed from the rear.

The coil antenna 601 (e.g., the antenna 480 of FIG. 5) may transmit power and/or data in the first direction D1. A shielding member may be disposed on one surface of the coil antenna 601. The magnet modules 610 and 620 may be disposed around the coil antenna 601. The magnet modules 610 and 620 may be disposed to surround the side surface of the coil antenna 610. The magnet modules 610 and 620 may be disposed as an inner part and an outer part relative to the coil antenna 601.

The magnet module 610 may be disposed as an inner part adjacent to the coil antenna 601. The magnet module 620 may be disposed as an outer part and may be a part spaced apart from the coil antenna 601. When a magnet having an N pole is disposed in the inner part 610 and a magnet having an S pole is disposed in the outer part 620, magnetic flux may be generated in a third direction D3 from the magnet module (outer part) 620 toward the magnet module (inner part) 610 when viewed in the first direction D1. When the magnetic flux is generated in the third direction D3, the magnetic flux may be induced to the coil antenna 601. When the magnetic flux is induced to the coil antenna 601, the shielding member disposed on the one surface of the coil antenna 601 may be saturated by the magnetic flux. When the shielding member is saturated so that the magnetic-field shielding function of the shielding member is reduced, a magnetic field generated from the coil antenna 601 may cause eddy currents in an electrical component or a metal part of the electronic device (e.g., the electronic device 101 of FIG. 3) disposed on the rear surface of the coil antenna 601, and therefore the efficiency of the coil antenna 601 may decrease.

The example embodiments of this disclosure decrease magnetic flux induced to the coil antenna 601 using the polarity structures when the magnet modules 610 and 620 are disposed around the coil antenna 601.

Figure 7A:
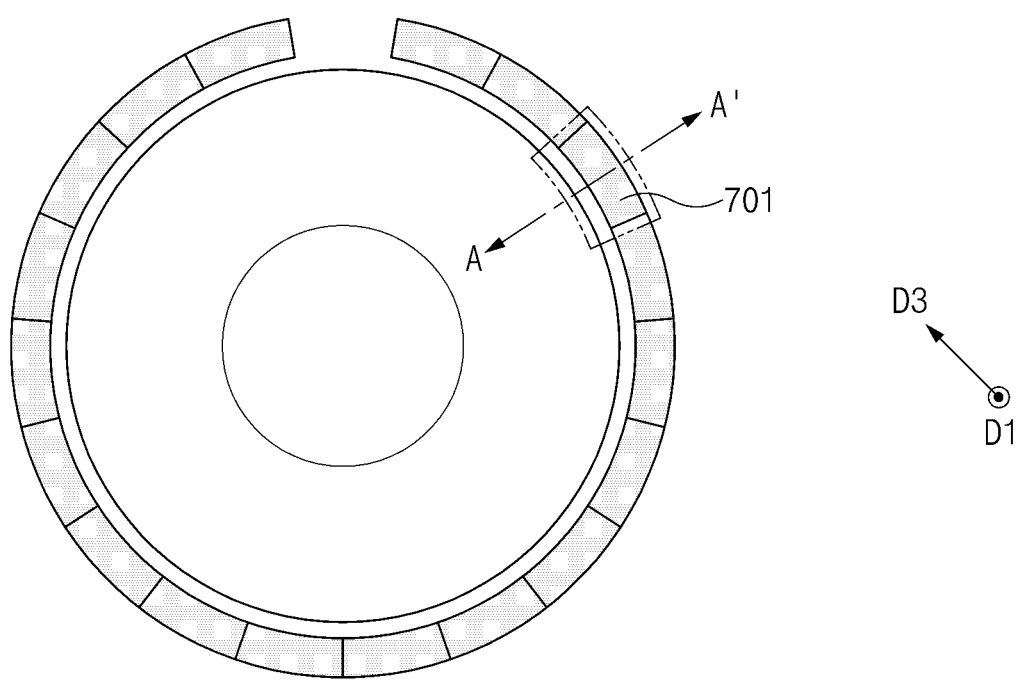
FIG. 7A illustrates a magnet module according to various embodiments as viewed in the first direction.
Figure 7B:
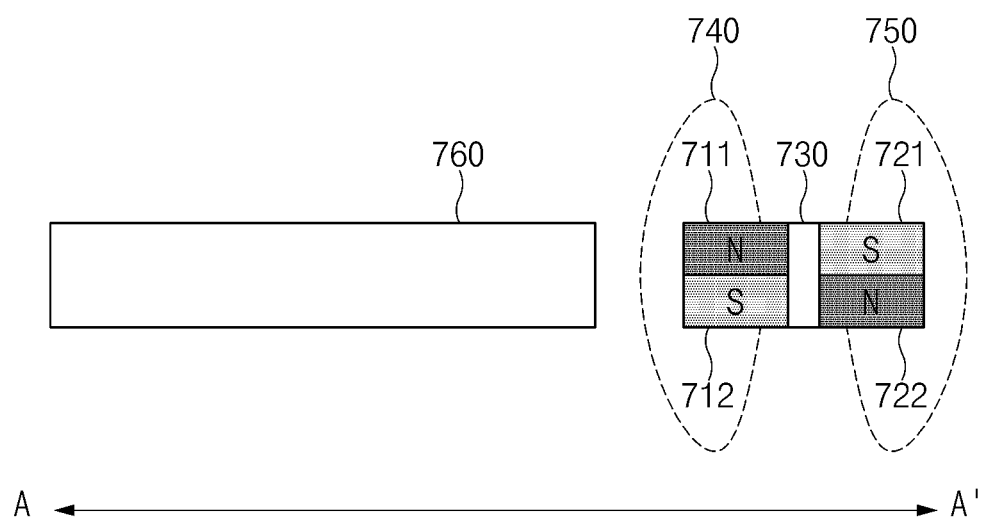
FIG. 7B illustrates a sectional view of portion A-A' of FIG. 7A when a magnet module according to various embodiments is viewed in a fourth direction that is a lateral direction of the electronic device.
Figure 7B:
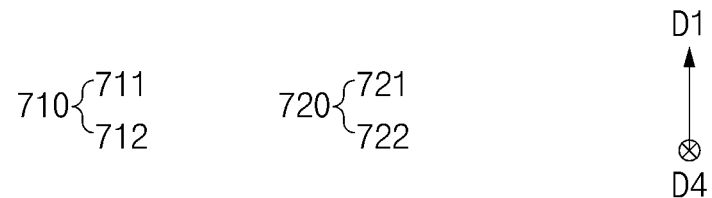
Figure 8:
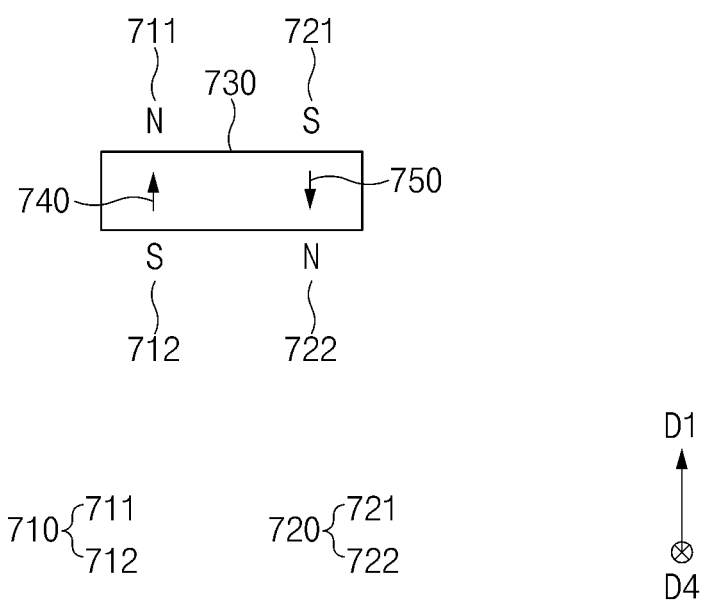
FIG. 8 illustrates the magnet module according to various embodiments as viewed in the fourth direction.

FIG. 7A illustrates an example magnet module 701 according to various embodiments as viewed in the first direction D1. FIG. 7B illustrates a sectional view of portion A-A' of FIG. 7A when the magnet module 701 is viewed in a fourth direction D4 that is a lateral direction of the electronic device (e.g., the electronic device 101 of FIG. 3). FIG. 8 illustrates the example magnet module 701 according to various embodiments as viewed in the fourth direction D4. As illustrated in FIG. 7B, the magnet module 701 may include an inner part 710, an outer part 720, and a non-magnetized area (or non-magnetized layer) 730. However, without being limited thereto, as illustrated in FIG. 7A, the magnet module 701 may be formed as one module for each unit area magnetized in the first direction D1 without the non-magnetized area 730. In this case, the polarity of the magnet module 701 may alternately have an N pole and an S pole for each unit area.

The inner part 710 may be disposed to face toward a side surface of a coil antenna (e.g., the coil antenna 601 of FIG. 6). The inner part 710, when viewed in the first direction D1, may be disposed to face the third direction (e.g., the third direction D3 of FIG. 6) toward the central area of the electronic device (e.g., the electronic device 101 of FIG. 5) based on the second direction D2. The inner part 710 may include a first inner layer (or a first inner area) 711 and a second inner layer (or a first inner area) 712 over the first inner layer 711. The second inner layer 712 is disposed on one side of the first inner layer 711. In FIG. 7B, the electronic device 101 is turned upside down so that the first direction D1 that the rear surface of the electronic device 101 faces is defined as an upper direction, and therefore the second inner layer 712 is illustrated below the first inner layer 711.

The inner part 710 may be formed of a magnetized rare-earth element. The inner part 710 may be formed of a magnetized metallic material. The magnetized inner part 710 may have polarities. The polarity of the first inner layer 711 and the polarity of the second inner layer 712 may differ from each other.

The outer part 720 may be disposed to face toward the opposite side to the coil antenna (e.g., the coil antenna 601 of FIG. 6). The outer part 720, when viewed in the first direction D1, may be disposed to face the direction opposite to the third direction D3. The outer part 720 may include a first outer layer 721 (or a first outer area) and a second outer layer (or a second outer area) 722 over the first outer layer 721. The second outer layer 722 is disposed on one side of the first outer layer 721. In FIG. 7B, the electronic device 101 is turned upside down so that the first direction D1 that the rear surface of the electronic device 101 faces is defined as the upper direction, and therefore the second outer layer 722 is illustrated below the first outer layer 721.

The outer part 720 may be formed of a magnetized rare-earth element. The outer part 720 may be formed of a magnetized metallic material. The magnetized outer part 720 may have polarities. The polarity of the first outer layer 721 and the polarity of the second outer layer 722 may differ from each other.

The non-magnetized area 730 may be disposed between the inner part 710 and the outer part 720. The non-magnetized area 730 may be formed of a non-magnetized rare-earth element. The non-magnetized area 730 may be formed of a non-magnetized metallic material. The non-magnetized area 730 may be formed of the same material as the inner part 710 and the outer part 720. The non-magnetized area 730 may have no polarity. The non-magnetized area 730 may be formed of a non-magnetized nonmetallic material. The non-magnetized area 730 may be formed of a material blocking a magnetic field.

The inner part 710 may form a magnetic field in the first direction D1. The inner part 710 may form a first magnetic field 740 due to the different polarities of the first inner layer 711 and the second inner layer 712.

The outer part 720 may form a magnetic field in an opposite direction to the first direction D1. The outer part 720 may form a second magnetic field 750 due to the different polarities of the first outer layer 721 and the second outer layer 722.

The magnet module 701 may be disposed to surround the side surface of the coil antenna 601. The lower surface of the coil antenna 601 may face the first direction D1. A battery (e.g., the battery 189 of FIG. 5) may be disposed under the lower surface of the coil antenna 601. A shielding member 760 may be disposed between the coil antenna 601 and the battery 189.

The first inner layer 711 and the second outer layer 722 may be magnetized with a first polarity. The first polarity may be an N pole.

The second inner layer 712 and the first outer layer 721 may be magnetized with a second polarity opposite to the first polarity. The second polarity may be an S pole.

The direction of the first magnetic field 740 formed by the first inner layer 711 and the second inner layer 712 and the direction of the second magnetic field 750 formed by the first outer layer 721 and the second outer layer 722 may be opposite to each other. The direction of the first magnetic field 740 formed by the first inner layer 711 and the second inner layer 712 may be the first direction D1. The direction of the second magnetic field 750 formed by the first outer layer 721 and the second outer layer 722 may be the direction opposite to the first direction D1.

The intensity of the first magnetic field 740 formed by the first inner layer 711 and the second inner layer 712 and the intensity of the second magnetic field 750 formed by the first outer layer 721 and the second outer layer 722 may be substantially the same as each other. Because the directions of the first magnetic field 740 and the second magnetic field 750 are opposite to each other and the intensities thereof are substantially the same as each other, magnetic forces may be in equilibrium.

The first magnetic field 740 formed by the first inner layer 711 and the second inner layer 712 and the second magnetic field 750 formed by the first outer layer 721 and the second outer layer 722 do not face toward the shielding member 760. Thus, the first magnetic field 740 and the second magnetic field 750 do not induce magnetic flux to the shielding member 760. Even though the first magnetic field 740 and the second magnetic field 750 are formed, a phenomenon in which the shielding member 760 is saturated may be reduced or prevented. When the shielding member 760 is not saturated, the magnetic-field shielding function of the shielding member 760 may be maintained. When the magnetic-field shielding function of the shielding member 760 is maintained, the shielding member 760 may shield a magnetic field generated from the coil antenna 601. When the shielding member 760 shields the magnetic field generated from the coil antenna 601, eddy currents may be prevented (or reduced) from being generated in an electrical component or a metal part of the electronic device 101, such as the battery 189, which is disposed on the rear surface of the coil antenna 601. Accordingly, the wireless power transmission efficiency of the coil antenna 601 may be increased.

Figure 9A:
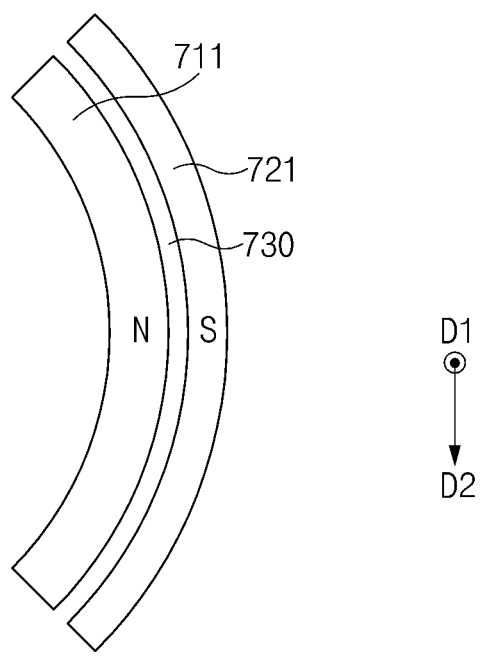
FIG. 9A illustrates an example magnet module according to various embodiments as viewed in the first direction.

FIG. 9A illustrates an example magnet module according to the disclosure (e.g., the magnet module 701 of FIGS. 7A and 7B) as viewed in the first direction D1.

When viewed from above in the first direction D1, the first inner layer 711 and the first outer layer 721 may be visible. The first inner layer 711 may be disposed adjacent to the coil antenna (e.g., the coil antenna 601 of FIG. 6). The first outer layer 721 may be disposed on the opposite side to the coil antenna 601. The first inner layer 711 may be an N pole. The first outer layer 721 may be an S pole.

The non-magnetized area 730 may be disposed between the first inner layer 711 and the first outer layer 721. The second inner layer (e.g., the second inner layer 712 of FIG. 7B) and the second outer layer (e.g., the second outer layer 722 of FIG. 7B) may be disposed over the first inner layer 711 and the first outer layer 721, respectively. The second inner layer 712 may be an S pole. The second outer layer 722 may be an N pole. Accordingly, a magnetic field may be formed in the first direction D1.

Figure 9B:
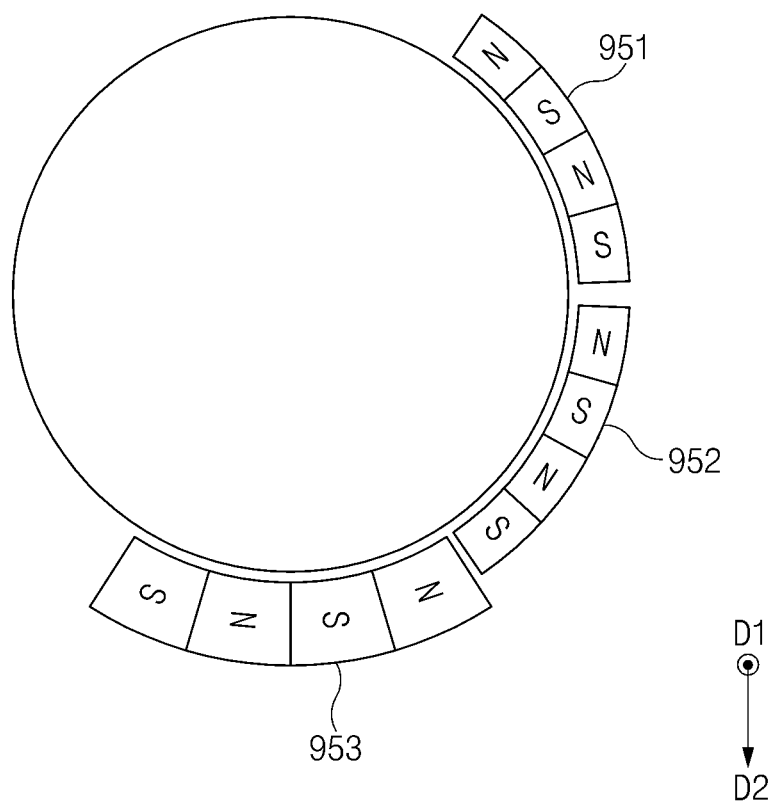
FIG. 9B illustrates an example magnet module according to various embodiments as viewed in the first direction.

FIG. 9B illustrates an example magnet module according to an embodiment of the disclosure (e.g., the magnet module 701 of FIGS. 7A and 7B) as viewed in the first direction D1.

The magnet module 701 may be formed without a distinction of an inner part (e.g., the inner part 710 of FIG. 7B) and an outer part (e.g., the outer part 720 of FIG. 7B). For example, the magnet module 701 may be formed such that different polarities are alternately disposed while surrounding the coil antenna 601. For example, as illustrated in FIG. 9B, the magnet module 701 may be formed such that N poles and S poles are alternately disposed while surrounding the coil antenna 601.

When viewed from above in the first direction D1, the magnet module 701 may be disposed in a first area 951, a second area 952, and a third area 953. The area of the magnet module 701 disposed in the first area 951, the area of the magnet module 701 disposed in the second area 952, and the area of the magnet module 701 disposed in the third area 953 may differ from one another. When the areas of the magnet modules 701 disposed in the first area 951, the second area 952, and the third area 953 differ from one another, the sizes of the magnet modules 701 may be adjusted depending on an electrical component disposed in the electronic device (e.g., the electronic device 101 of FIG. 3), and thus the magnet modules 701 may be easily mounted. For example, the area of the magnet modules 701 disposed in each of the first area 951, the second area 952, and the third area 953 may be adjusted depending on a size of an electrical component disposed in the electronic device 101, a size of a magnitude of an electric field generated by the electrical component, or a size of a magnetic field generated by the electrical component.

Figure 10:
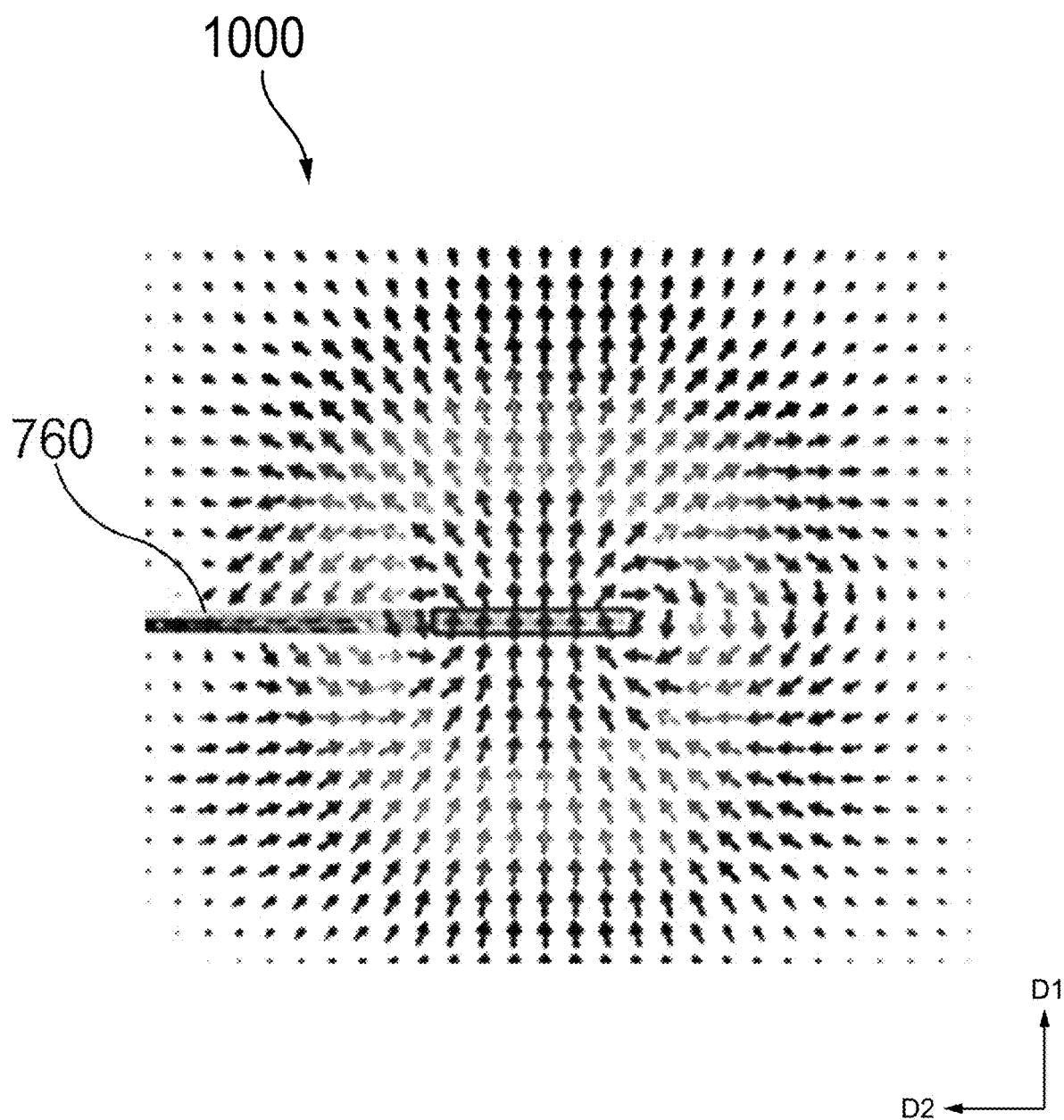
FIG. 10 illustrates magnetic flux generated around a shielding member by an magnet module according to various embodiments.

FIG. 10 illustrates magnetic flux generated around the shielding member 760 by an example magnet module according to the disclosure (e.g., the magnet module 701 of FIGS. 7A and 7B).

In an embodiment, magnetic flux may be formed around the shielding member 760 in the first direction D1 by the magnet module 701. The ratio of the magnetic flux flowing into the shielding member 760 in the second direction D2 to the magnetic flux generated by the magnet module 701 may be maintained less than a specified ratio. Saturation of the shielding member 760 may be reduced by decreasing the magnetic flux generated by the magnet module 701 and flowing into the shielding member 760.

Figure 11:
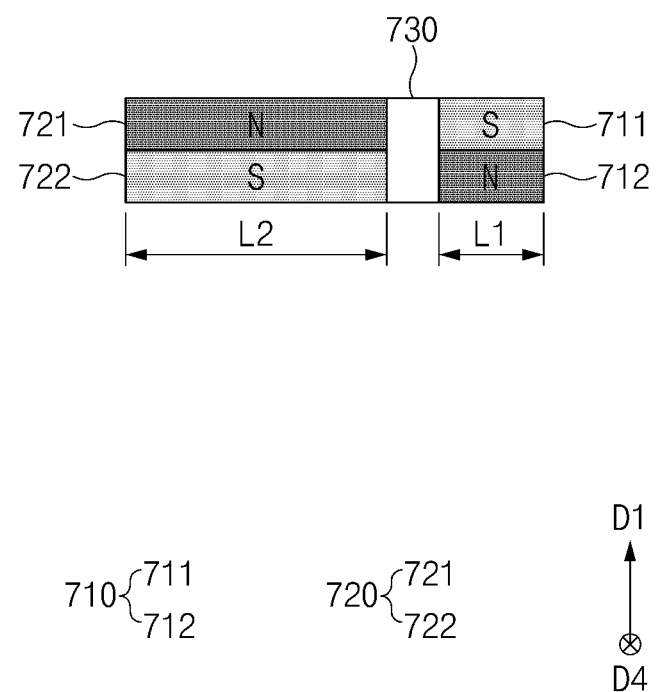
FIG. 11 illustrates an example magnet module according to various embodiments as viewed in the fourth direction.

FIG. 11 illustrates an example magnet module according to the disclosure (e.g., the magnet module 701 of FIGS. 7A and 7B) as viewed in the fourth direction D4.

The magnet module 701 may include an inner part 710, an outer part 720, and a non-magnetized area 730. The inner part 710 may be disposed to face toward a side surface of a coil antenna (e.g., the coil antenna 601 of FIG. 6). The outer part 720 may be disposed to face toward the opposite side to the coil antenna 601. The non-magnetized area 730 may be disposed between the inner part 710 and the outer part 720. The inner part 710 may include a first inner layer 711 and a second inner layer 712. The outer part 720 may include a first outer layer 721 and a second outer layer 722.

The inner part 710 and the outer part 720 may have asymmetrical structures in the second direction D2 that is a horizontal direction of the electronic device (e.g., the electronic device 101 of FIG. 3). When the electronic device 101 is viewed in the first direction D1 that is a vertical direction, the area of the inner part 710 and the area of the outer part 720 may differ from each other. When the electronic device 101 is viewed in the first direction D1, the shape of the inner part 710 and the shape of the outer part 720 may differ from each other.

The inner part 710 may have a first length L1 in the second direction D2 that is the lengthwise direction of the electronic device 101. The outer part 720 may have a second length L2 in the second direction D2 that is the lengthwise direction of the electronic device 101. The second length L2 may be longer than the first length L1. When the length of the outer part 720 in the second direction D2 is longer than the length of the inner part 710 in the second direction D2, a tensile force between the outer part 729 and electronic device 101 and an adhesive force between the outer part 729 and electronic device 101 when the outer part 720 is mounted in the electronic device 101 may be improved.

Figure 12:
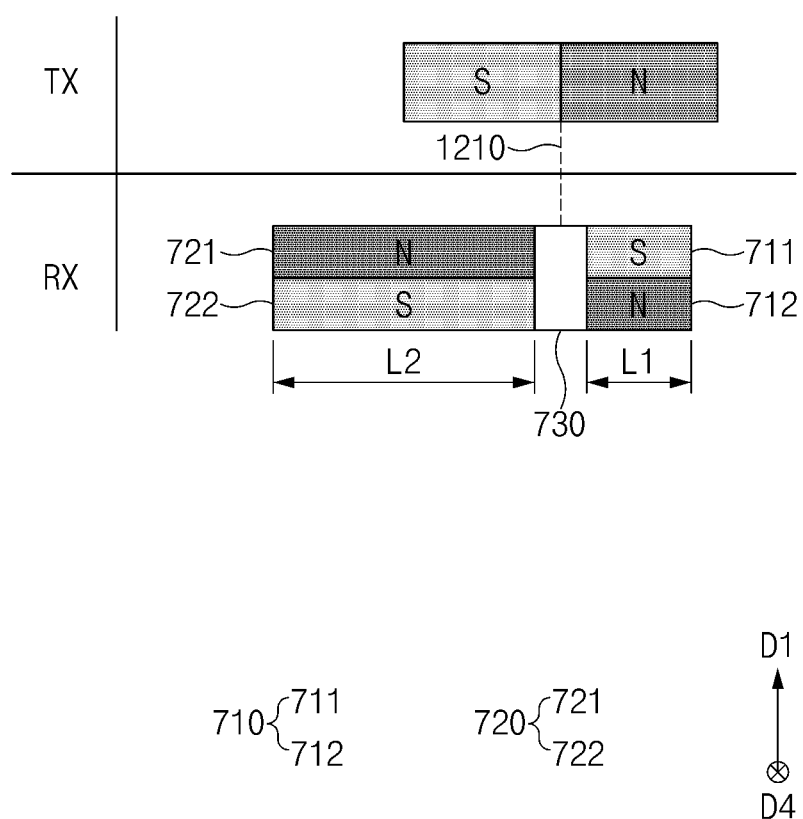
FIG. 12 illustrates an example magnet module according to various embodiments as viewed in the fourth direction.

FIG. 12 illustrates an example magnet module according to the disclosure (e.g., the magnet module 701 of FIGS. 7A and 7B) as viewed in the fourth direction D4.

The electronic device 101 and an external electronic device (e.g., the external electronic device 310 of FIG. 3) may wirelessly transmit and receive power. A side toward the electronic device (e.g., the electronic device 101 of FIG. 3) may be defined as a reception end RX. The magnet module 701 may be disposed at the reception end RX. The magnet module 701 disposed at the reception end RX may include an inner part 710, an outer part 720, and a non-magnetized area 730. The inner part 710 may be disposed to face toward a side surface of a coil antenna (e.g., the coil antenna 601 of FIG. 6). The outer part 720 may be disposed to face toward the opposite side to the coil antenna 601. The non-magnetized area 730 may be disposed between the inner part 710 and the outer part 720. The inner part 710 may include a first inner layer 711 and a second inner layer 712. The outer part 720 may include a first outer layer 721 and a second outer layer 722.

A side toward the external electronic device 310 may be defined as a transmission end TX. A magnet module having a single layer may be disposed at the transmission end TX. The magnet module disposed at the transmission end TX may be disposed to face the first inner layer 711 and the first outer layer 721 of the magnet module 701, which is disposed at the reception end RX, in the first direction D1. The polarities of the magnet module disposed at the transmission end TX may be opposite to the polarities of the first inner layer 711 and the first outer layer 721 that face the magnet module disposed at the transmission end TX in the first direction D1. When the polarity of the first inner layer 711 is an S pole, the polarity of the magnet module at the transmission end TX that faces the first inner layer 711 may be an N pole. When the polarity of the first outer layer 721 is an N pole, the polarity of the magnet module at the transmission end TX that faces the first outer layer 721 may be an S pole.

A boundary surface 1210 may be defined in the magnet module disposed at the transmission end TX. The boundary surface 1210 may be a surface that distinguishes (demarcates) between two polarity portions of the magnet module disposed at the transmission end TX. The boundary surface 1210 may be aligned with the non-magnetized area 730 of the magnet module 701 disposed at the reception end RX. When viewed in the first direction D1 that the rear surface of the electronic device 101 faces, the boundary surface 1210 may be aligned with the central portion of the non-magnetized area 730. The magnetic flux formed in the first direction D1 may be balanced even when the boundary surface 1210 of the magnet module disposed at the transmission end TX is disposed to correspond to the non-magnetized area 730 and the outer part 720 is expanded, compared to the inner part 710.

Figure 13:
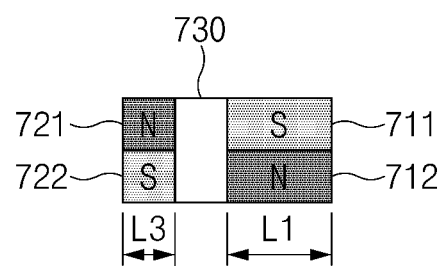
FIG. 13 illustrates an example magnet module according to various embodiments as viewed in the fourth direction.
Figure 13:
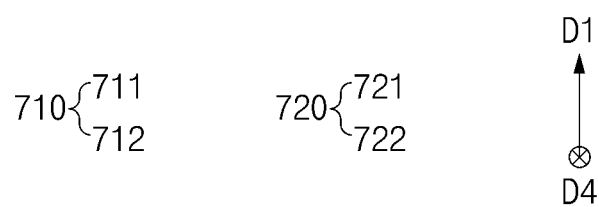

FIG. 13 illustrates an example magnet module according to the disclosure (e.g., the magnet module 701 of FIGS. 7A and 7B) as viewed in the fourth direction D4.

An inner part 710 may have a first length L1 in the second direction D2 that is the lengthwise direction of the electronic device (e.g., the electronic device 101 of FIG. 3). An outer part 720 may have a third length L3 in the second direction D2 that is the lengthwise direction of the electronic device 101. The third length L3 may be shorter than the first length L1. When the length of the outer part 720 in the second direction D2 is shorter than the length of the inner part 710 in the second direction D2, the outer part 720 may be more easily disposed in a portion in which it is difficult to mount the outer part 720 in the electronic device 101 due to an electrical component disposed in the electronic device 101.

Figure 14:
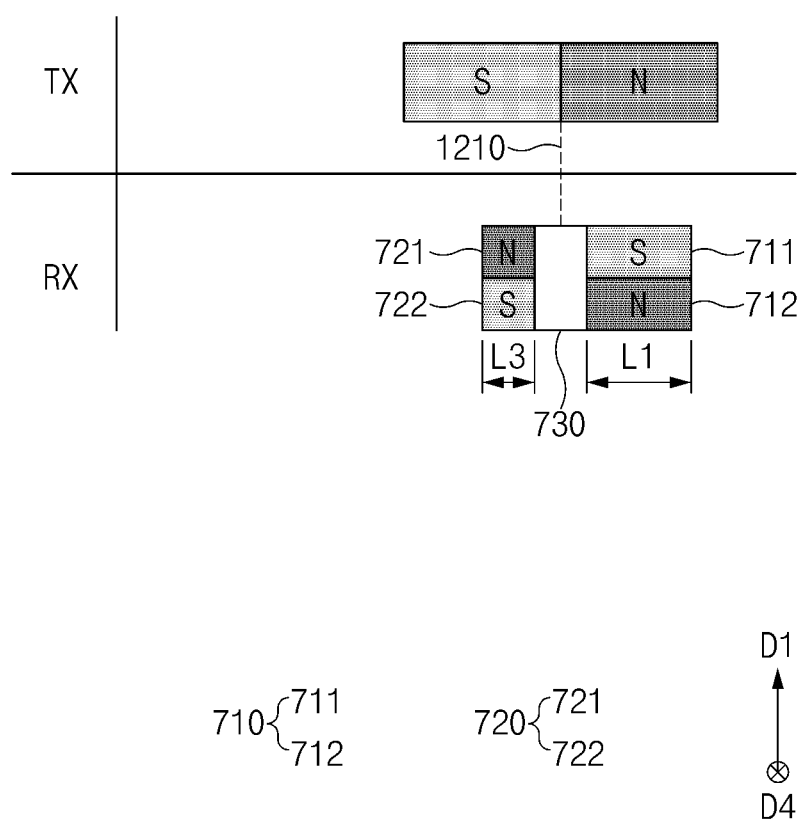
FIG. 14 illustrates an example magnet module according to various embodiments as viewed in the fourth direction.

FIG. 14 illustrates an example magnet module according to the disclosure (e.g., the magnet module 701 of FIGS. 7A and 7B) as viewed in the fourth direction D4.

The magnet module 701 may be disposed at a reception end RX toward the electronic device (e.g., the electronic device 101 of FIG. 3). A magnet module having a single layer may be disposed at a transmission end TX toward an external electronic device (e.g., the external electronic device 310 of FIG. 3).

A boundary surface 1210 of the magnet module disposed at the transmission end TX may be aligned with a non-magnetized area 730 of the magnet module 701 disposed at the reception end RX. When viewed in the first direction D1 that the rear surface of the electronic device 101 faces, the boundary surface 1210 may align with the central portion of the non-magnetized area 730. The magnetic flux formed in the first direction D1 may be balanced even when the boundary surface 1210 of the magnet module disposed at the transmission end TX is disposed to correspond to the non-magnetized area 730 and the outer part 720 is reduced, compared to the inner part 710.

Figure 15A:
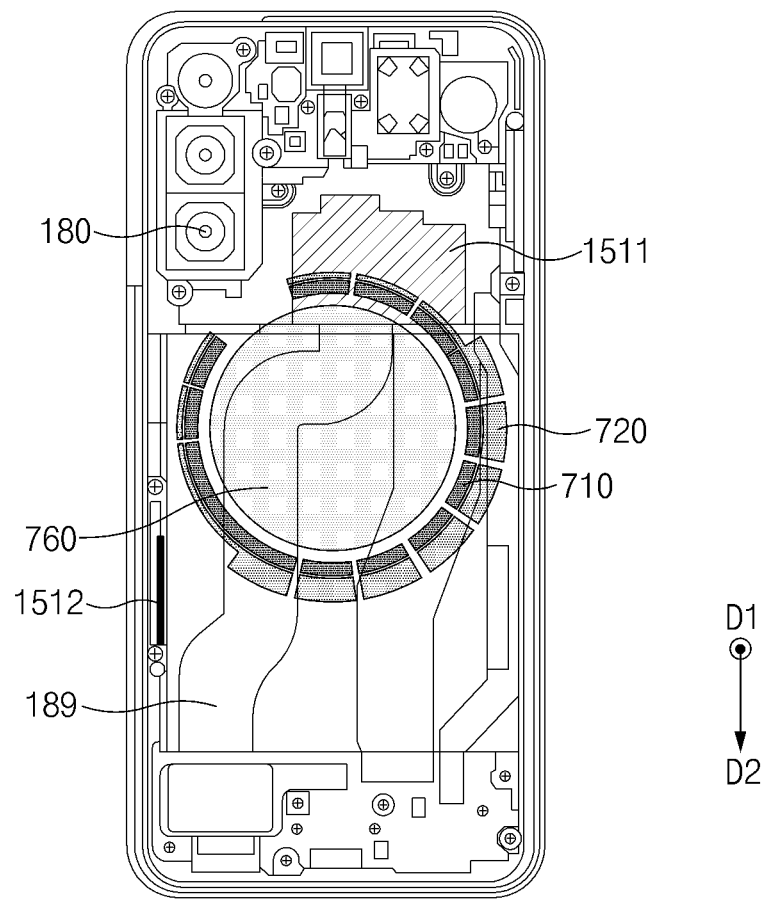
FIG. 15A illustrates an example electronic device according to various embodiments as viewed in the first direction.

FIG. 15A illustrates an example electronic device according to the disclosure (e.g., the electronic device 101 of FIG. 3) as viewed in the first direction D1.

When viewed in the first direction D1 that the rear surface of the electronic device 101 faces, a magnet module (e.g., the magnet module 701 of FIGS. 7A and 7B) may be disposed to surround a shielding member 760. The magnet module 701 may include an inner part 710 and an outer part 720. When viewed in the first direction D1, the inner part 710 may be disposed to face toward the shielding member 760. When viewed in the first direction D1, the outer part 720 may be disposed to face toward the opposite side to the shielding member 760.

The inner part 710 and the outer part 720 may include two layers having different polarities. The inner part 710 and the outer part 720 may form magnetic fields in the first direction D1. When the inner part 710 and the outer part 720 form the magnetic fields in the first direction D1, a phenomenon in which the shielding member 760 is saturated may be reduced. When the saturation of the shielding member 760 is reduced, eddy currents formed in a metal part of the electronic device 101, such as the battery 189, may be decreased. Accordingly, the magnetic fields formed by the inner part 710 and the outer part 720 may be prevented from being lost in the form of eddy currents, and thus the power transmission efficiency of the magnet module 701 may be improved.

When viewed in the first direction D1, the width of the inner part 710 may be constant. When viewed in the first direction D1, the outer part 720 may have an asymmetrical structure. When viewed in the first direction D1, the width of the outer part 720 may differ from the width of the inner part 710.

The width of the outer part 720 disposed in the area in which electrical components 1511 and 1512 of the electronic device 101 are disposed may be smaller than the width of the inner part 710. The electrical components 1511 and 1512 may include the first module 1511 and the second module 1512. The electrical components 1511 and 1512 may be modules that transfer and receive various electrical signals in the electronic device 101. The first module 1511 may be an ultra wide band (UWB) patch antenna. The second module 1512 may be a millimeter wave (mmWave) module. The width of the outer part 720 disposed in an area adjacent to the first module 1511 or the second module 1512 so as not to overlap the first module 1511 and the second module 1512 may be smaller than the width of the inner part 710. When the width of the outer part 720 disposed in the area adjacent to the first module 1511 or the second module 1512 is decreased, the outer part 720 may be disposed while the separation distance between the outer part 720 and the antenna 480 is secured. Accordingly, a phenomenon in which the first module 1511 or the second module 1512 is affected by the magnet module 701 may be reduced.

The inner part 710 and the outer part 720 may be removed from an area adjacent to the camera module 180 of the electronic device 101. The camera module 180 may be sensitive to a magnet and a magnetic field. When a magnet module is not disposed in the area adjacent to the camera module 180, a phenomenon in which the camera module 180 is affected by a magnet module may be further reduced.

The width of the outer part 720 disposed in an area other than the areas adjacent to the electrical components 1511 and 1512 and the camera module 180 of the electronic device 101 may be greater than the width of the inner part 710. When the width of the outer part 720 is decreased in the area adjacent to the electrical components 1511 and 1512 of the electronic device 101 or the inner part 710 and the outer part 720 are removed from the area adjacent to the camera module 180, a tensile force and an adhesive force when the magnet module 701 is mounted in the electronic device 101 may be reduced. The tensile force and the adhesive force of the magnet module 701 may be increased when the outer part 720 is expanded such that the width of the outer part 720 is greater than the width of the inner part 710 in an area other than the areas adjacent to the electrical components 1511 and 1512 and the camera module 180 of the electronic device 101. Accordingly, even when the width of the outer part 720 is decreased in the area adjacent to the electrical components 1511 and 1512 of the electronic device 101 or the inner part 710 and the outer part 720 are removed from the area adjacent to the camera module 180, problems associated with tension and adhesion may be decreased when the magnet module 701 is disposed.

Figure 15B:
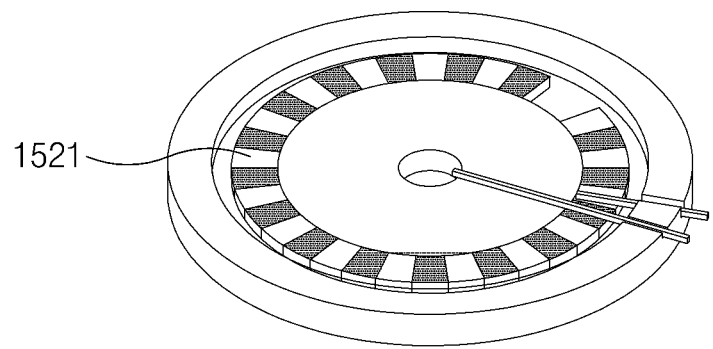
FIG. 15B illustrates an example external electronic device according to various embodiments.

FIG. 15B illustrates an example external electronic device according to the disclosure (e.g., the external electronic device 310 of FIG. 3).

The external electronic device 310 may include a magnet module 1521 having a single layer. The magnet module 1521 having the single layer may be formed in a circular shape. The magnet module 1521 having the single layer may be provided such that different polarities are alternately disposed along the circular shape.

Figure 15C:
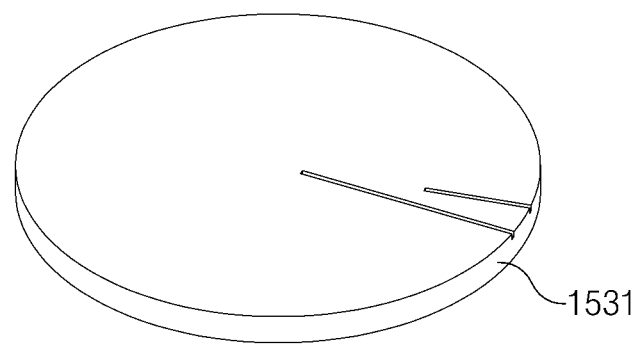
FIG. 15C is an exploded perspective view of an example external electronic device according to various embodiments.
Figure 15C:
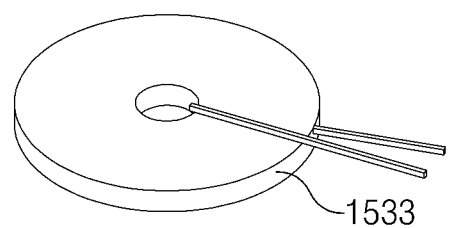
Figure 15C:
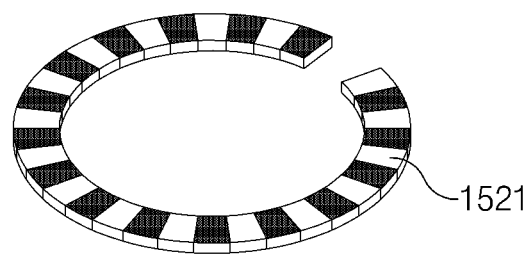
Figure 15C:
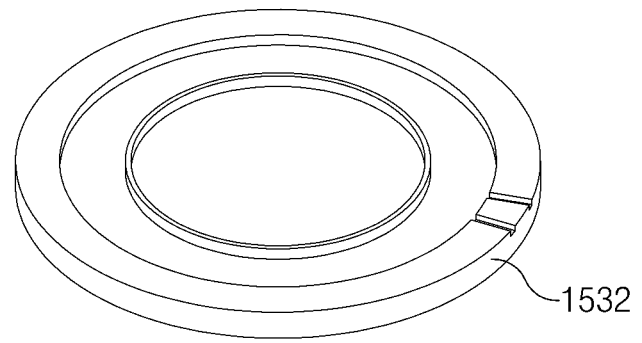

FIG. 15C is an exploded perspective view of an example external electronic device according to the disclosure (e.g., the external electronic device 310 of FIG. 3).

The external electronic device 310 may include a first housing 1531, a second housing 1532, and a power transmission and reception coil 1533. The power transmission and reception coil 1533 may be disposed between the first housing 1531 and the second housing 1532. The magnet module 1521 may be disposed to surround the power transmission and reception coil 1533.

Figure 15D:
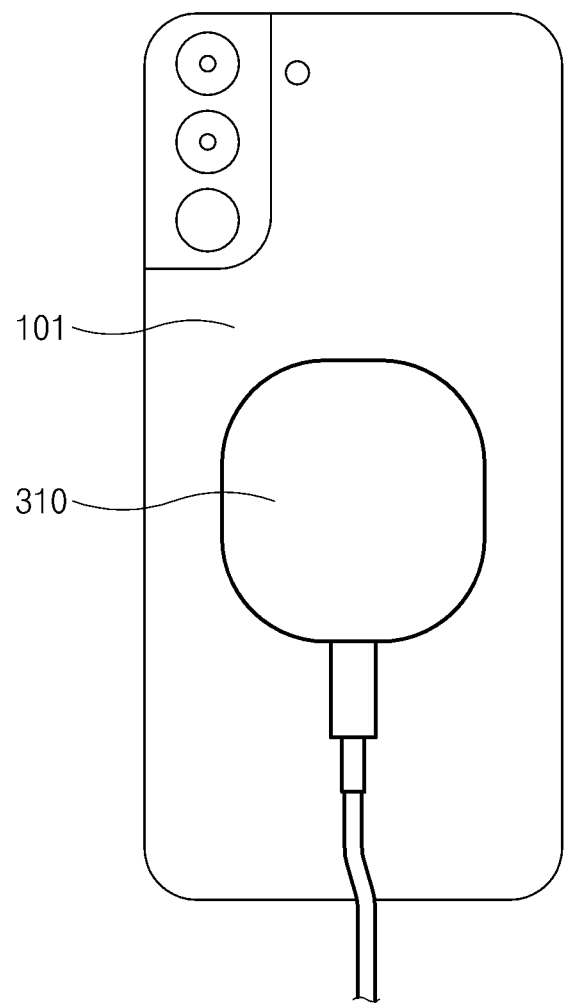
FIG. 15D illustrates attachment of an example external electronic device to an example electronic device according to various embodiments.

FIG. 15D illustrates attachment of the external electronic device 310 to the electronic device 101 according to the disclosure.

The external electronic device 310 may be attached to the rear surface of the electronic device 101. The external electronic device 310 may be attached to the rear surface of the electronic device 101 by the magnet module 701 of the electronic device 101. The external electronic device 310 may be attached to at least partially overlap an antenna of the electronic device 101 (e.g., the antenna 480 of FIG. 4) in the first direction D1. For example, the external electronic device 310 may be attached to an area corresponding to a coil antenna of the electronic device 101 (e.g., the coil antenna 601 of FIG. 6).

Figure 16:
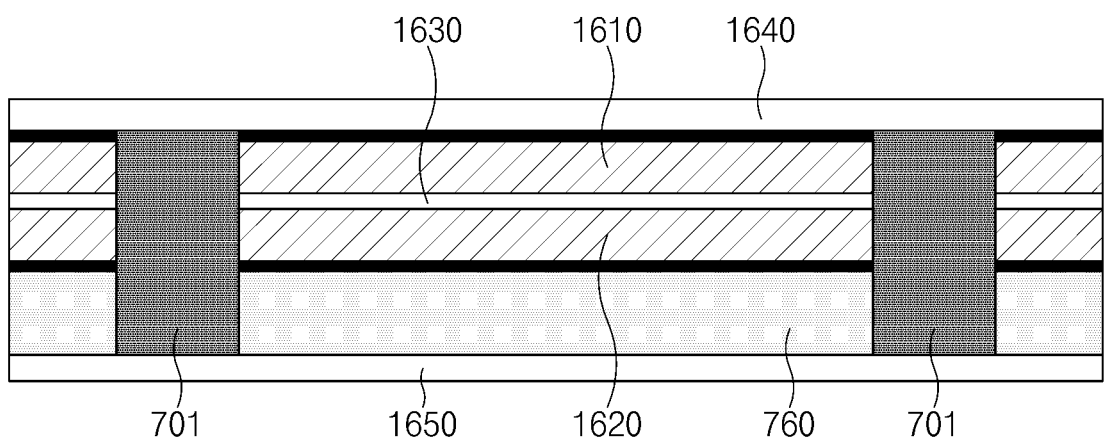
FIG. 16 illustrates an example antenna including a coil antenna and formed on an FPCB according to various embodiments as viewed in the fourth direction.
Figure 16:
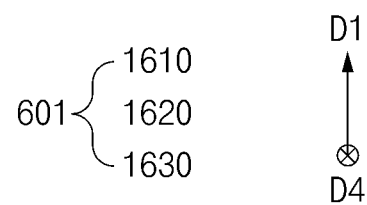

FIG. 16 illustrates an example antenna (e.g., the antenna 480 of FIG. 4) including a coil antenna and formed on an FPCB according to the disclosure as viewed in the fourth direction D4.

The antenna 480 may include an antenna coil 601, a magnet module 701, a shielding member 760, a protective member 1640, and a heat radiating member 1650. The antenna coil 601 may include a first metal layer 1610, a second metal layer 1620, and a base layer 1630.

The first metal layer 1610 may be formed of metal having excellent electrical conductivity, such as copper. The first metal layer 1610 may include a coil pattern according to a standard set by the wireless power consortium (WPC), which is an international standard.

The second metal layer 1620 may be disposed closer to the first direction D1, which the rear surface of the electronic device 101 faces, than the first metal layer 1610. The structure and shape of the second metal layer 1620 may be substantially the same as those of the first metal layer 1610.

The base layer 1630 may be disposed between the first metal layer 1610 and the second metal layer 1620. The base layer 1630 may space the first metal layer 1610 and the second metal layer 1620 apart from each other.

The shielding member 760 may be disposed under the antenna coil 601. The shielding member 760 may block a magnetic field formed from the antenna coil 601 in the first direction D1. The shielding member 760 may be formed of nano crystal.

The magnet module 701 may be disposed to surround the side surface of the antenna coil 601. The area in which the magnet module 710 is disposed and the area in which the shielding member 760 is disposed may not overlap each other.

The protective member 1640 may cover the upper surface of the antenna coil 601. The protective member 1640 may be formed of a sponge and/or a protective film.

The heat radiating member 1650 may cover the lower surface of the shielding member 760. The heat radiating member 1650 may be formed of graphite or a sheet blocking thermal diffusion.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" storage medium refers, for example, to a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a battery;
   a coil antenna configured to transmit power of the battery;
   a shield disposed on a lower surface of the coil antenna; and
   a plurality of magnet modules formed to surround at least a portion of a side surface of the coil antenna and including a first magnet module and a second magnet module disposed in a different area from the first magnet module,
   wherein the first magnet module includes a first inner magnet and a first outer magnet,
   wherein the second magnet module includes a second inner magnet and a second outer magnet,
   wherein each of the first inner magnet and the second inner magnet includes a first inner area and a second inner area disposed on one side of the first inner area,
   wherein each of the first outer magnet and the second outer magnet includes a first outer area and a second outer area disposed on one side of the first outer area,
   wherein the first inner area and the second outer area are magnetized with a first polarity
   wherein the second inner area and the first outer area are magnetized with a second polarity opposite to the first polarity, and
   wherein, when viewed from the lower surface of the coil antenna, a size of the first inner magnet is equal to a size of the second inner magnet and a size of the first outer magnet is different from a size of the second outer magnet.

2. The electronic device of claim 1, wherein the battery is disposed under the lower surface of the coil antenna, and
   wherein the shield is disposed between the coil antenna and the battery.

3. The electronic device of claim 1, wherein
   the first magnet module is disposed in a first area adjacent to an area in which at least one electrical component is disposed; and
   the second magnet module is disposed in a second area other than the first area and adjacent to an area in which at least one electrical component is disposed, and
   a width of the first inner magnet in a first direction away from the coil antenna of the first magnet module is equal to a width of the second inner magnet of the second magnet module in a second direction away from the coil antenna.

4. The electronic device of claim 3, wherein a width of the first outer magnet of the first magnet module in the first direction is larger than a width of the second outer magnet of the second magnet module in the second direction.

5. The electronic device of claim 1, further comprising:
   a camera module comprising a camera,
   wherein magnetic modules of the plurality of magnet modules are not disposed in a portion adjacent to the camera module in an area around the coil antenna.

6. The electronic device of claim 1, wherein the first inner magnet and the second inner magnet form a first magnetic field in a first direction that the lower surface of the coil antenna faces and the first outer magnet and the second outer magnet form a second magnetic field in a second direction opposite to the first direction.

7. The electronic device of claim 1, wherein the first inner magnet, the second inner magnet, the first outer magnet and the second outer magnet comprise a magnetized rare-earth element.

8. The electronic device of claim 1, further comprising:
   a non-magnetized area disposed between the first inner magnet and the first outer magnet and disposed between the second inner magnet and the second outer magnet,
   wherein the non-magnetized area comprises a non-magnetized rare-earth element.

9. The electronic device of claim 1, further comprising:
   a non-magnetized area disposed between the first inner magnet and the first outer magnet and disposed between the second inner magnet and the second outer magnet,
   wherein an external electronic device configured to wirelessly transmit and receive power with the electronic device is attachable to an area of a rear surface of the electronic device corresponding to the coil antenna, and wherein a boundary surface configured to distinguish between two polarity portions of another magnet module included in the external electronic device aligns with the non-magnetized area.

10. An electronic device comprising:

a battery;

a coil antenna configured to transmit power of the battery;

a shield disposed on a lower surface of the coil antenna; and a plurality of magnet modules formed to surround at least a portion of a side surface of the coil antenna and including a first magnet module and a second magnet module disposed in a different area from the first magnet module, wherein each of a first magnet module and a second magnet module includes:

an inner magnet;

an outer magnet; and a non-magnetized area disposed between the inner magnet and the outer magnet, wherein the inner magnet forms a first magnetic field in a first direction parallel to an axis of the coil antenna, wherein the outer magnet forms a second magnetic field in a second direction opposite to the first direction, wherein a width of the outer magnet of the first magnet module is smaller than a width of the inner magnet of the first magnet module, and wherein a width of the outer magnet of the second magnet module is greater than a width of the inner magnet of the second magnet module.

11. An electronic device comprising:

a battery;

a coil antenna configured to transmit power of the battery;

a shield disposed on a lower surface of the coil antenna; and a plurality of magnet modules formed to surround at least a portion of a side surface of the coil antenna, wherein each of the plurality of magnet modules includes:

an inner magnet;

an outer magnet; and a non-magnetized area disposed between the inner magnet and the outer magnet, wherein a width of the inner magnet of each of the plurality of magnet modules in respective directions away from the coil antenna is constant, and wherein a width of the outer magnet of a first magnet module in a first direction away from the coil antenna in a first area in which an electrical component of the electronic device is disposed differs from a width of the outer magnet of a second magnet module in a second direction away from the coil antenna in a second area other than the first area.

12. The electronic device of claim 11, wherein the width of the outer magnet of the first magnet module is smaller than a width of the inner magnet of the first magnet module in the first direction away from the coil antenna.

13. The electronic device of claim 11, wherein magnet modules of the plurality of magnet modules are not disposed in an area adjacent to a camera module comprising a camera of the electronic device.

14. The electronic device of claim 11, wherein the width of the outer magnet of the second magnet module is greater than a width of the inner magnet of the second magnet module in the second direction.

15. The electronic device of claim 11, wherein the inner magnet forms a first magnetic field in a third direction and the outer magnet forms a second magnetic field in a fourth direction opposite the third direction.

* * * * *